United States Patent
Gustin et al.

[11] Patent Number: 5,805,844
[45] Date of Patent: Sep. 8, 1998

[54] CONTROL CIRCUIT FOR AN INTERFACE BETWEEN A PCI BUS AND A MODULE BUS

[76] Inventors: Jay W. Gustin, 6226 E. Joan de Arc, Scottsdale, Maricopa County, Ariz. 85254; Michael L. Hodge, 4044 E. Cascalote Dr., Cave Creek, Maricopa County, Ariz. 85331

[21] Appl. No.: 727,725

[22] Filed: Oct. 7, 1996

[51] Int. Cl.$^6$ ................................................ G06F 13/12
[52] U.S. Cl. ........................ 395/309; 395/308; 395/842
[58] Field of Search ................................ 395/309, 306, 395/308, 842, 310

[56] References Cited

U.S. PATENT DOCUMENTS

| | | | |
|---|---|---|---|
| 5,623,697 | 4/1997 | Bland et al. | 395/842 |
| 5,664,122 | 9/1997 | Rabe et al. | 395/308 |

*Primary Examiner*—Jack B. Harvey
*Assistant Examiner*—Jeffrey K. Seto
*Attorney, Agent, or Firm*—Arthur A. Sapelli; Anthony Miologos

[57] ABSTRACT

A control circuit for the interface circuit of a module of a distributed process control system permits its kernel submodule and peripheral submodule to communicate through the interface circuit notwithstanding that the structure and protocol of module BUS of the kernel submodules is incompatible with the structure and protocol of the PCI BUS of the peripheral submodule. The control circuit includes a module BUS state machine (MBSM), a PCI target state machine (PTSM), an arbiter state machine (ARSM), and an address decode logic (ADL) circuit. In response to control signals from the kernel and peripheral submodules applied to the control circuit over their respective buses, and control signals produced by the MBSM, the PTSM, the ARSM, and the ADL circuit. Which one of the two submodules is granted access to the registers of the interface circuit is determined by the control circuit which also grants the peripheral submodule access through the interface circuit to the memory of the kernel submodule. If both submodules request access to the interface circuit at the same time the peripheral submodule has priority. The control circuit prevents either submodule from successive accesses to the interface circuit if the other submodule has a request for access pending.

14 Claims, 6 Drawing Sheets

CONTROL CIRCUIT FOR AN INTERFACE BETWEEN A PCI BUS AND A MODULE BUS

CROSS-REFERENCE TO RELATED APPLICATION

U.S. patent application Ser. No. 08/727,724 of Jay W. Gustin, et al, entitled "Improved Universal Operator Station Module for a Distributed Process Control System", filed Oct. 7, 1996, which application is assigned to the assignee of the present invention, and which is incorporated herein by reference and made a part hereof as if fully set forth herein.

BACKGROUND OF THE INVENTION (1) Field of the Invention

This invention is in the field of control circuits, and more particularly to control circuits implemented by state machines for controlling access to the interface circuit of a module of a distributed process control system through which the submodules of a module communicate.

(2) Description of Related Art

Distributed process control systems, such as Honeywell Inc.'s TDC 3000, provides a computerized plant management system, a version of which is described and claimed in U.S. Pat. No. 4,607,256, which issued Aug. 19, 1986. Each such process control system includes a plurality of different type of modules with each module including a common kernel submodule. Each module also includes a peripheral submodule, with the functions and structures of the peripheral submodule of each generally being different. All communications between a given module and other modules of the system are via the network's local control network (LCN) BUS, with access to the LCN being via each modules kernel submodule. Communication between a kernel submodule and its associated peripheral submodule is through an interface circuit. All of the hardware and software components of the kernel and peripheral submodules of prior art modules were specially designed to perform the functions required of a given module.

There has been a tremendous increase in the performance of commercially available personal computers (PC)s, their associated peripheral devices, and related operating system software, and with a concomitant reduction in their cost in recent years. Thus, it is desirable to incorporate commercially available PCs, peripherals, and software into the peripheral submodule of a module such as a universal operator station module in place of the specialized hardware and software components of the peripheral submodule of an operator station module of such a system, for example. The problem with doing so is that the commercially available hardware and software communicate using industry standard commercially available BUS protocols, an example of one of which is the peripheral component interconnect (PCI) BUS and signaling protocol. Unfortunately, the PCI BUS and signaling protocol is incompatible with the BUS and signaling protocol of the module BUS. In the above identified cross-referenced patent application entitled Improved Universal Operator Station Module for a Distributed Process Control System a solution to this problem is taught which includes an interface circuit that permits a kernel submodule of a given module to communicate through a new interface circuit with its associated peripheral submodule which is implemented in commercially available hardware and software without requiring any changes to the hardware and software components of the kernel submodule. The control circuit of this invention controls the operation of the interface circuit and access to the interface circuit by the submodules of the module.

SUMMARY OF THE INVENTION

The present invention provides a control circuit for the interface circuit which interface circuit permits communication via the interface circuit between a kernel submodule and a peripheral submodule of a module of a distributed process control system. The components of the peripheral module are standard commercially available electronic components and such hardware's associated software. The structure and protocols of the module BUS of the kernel submodule is incompatible with the structure and protocol of the commercially available BUS of the peripheral submodule such as a PCI BUS. The control circuit is implemented by three state machines. One is the arbiter circuit, or arbiter state machine (ARSM), the second is the PCI target state machine (PTSM) and the third is the module BUS state machine (MBSM). The arbiter state machine determines which BUS, the module BUS of the kernel submodule or the PCI BUS of the peripheral submodule has access to the components of the interface circuit in response to control signals from the module BUS state machine and the PCI state machine.

The PCI protocol, as represented by signals on the PCI BUS is interpreted by the PTSM. It is the function of the PTSM to detect signals received from the PCI BUS to determine which component of the interface circuit such signals are addressed and when such signals will be transmitted. In addition, PTSM produces control signals for the ARSM and the MBSM.

The MBSM produces module BUS control signals which allow the kernel submodule to read, or write into one of the registers of the interface circuit that the module BUS is permitted to access. The MBSM also produces module BUS control signals which permit a direct memory access operation to be executed by the peripheral submodule to or from the memory of the kernel submodule.

It is therefore an object of this invention to provide an improved control circuit for the interface circuit of an operator station module of a distributed process control system.

It is another object of this invention to provide an improved control circuit for the interface circuit of a module of a distributed process control system which includes a plurality of state machines.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be affected without departing from the spirit and scope of the novel concepts of the disclosure, and in which.

DESCRIPTION OF THE PREFERRED EMBODIMENTS

Figure 1:
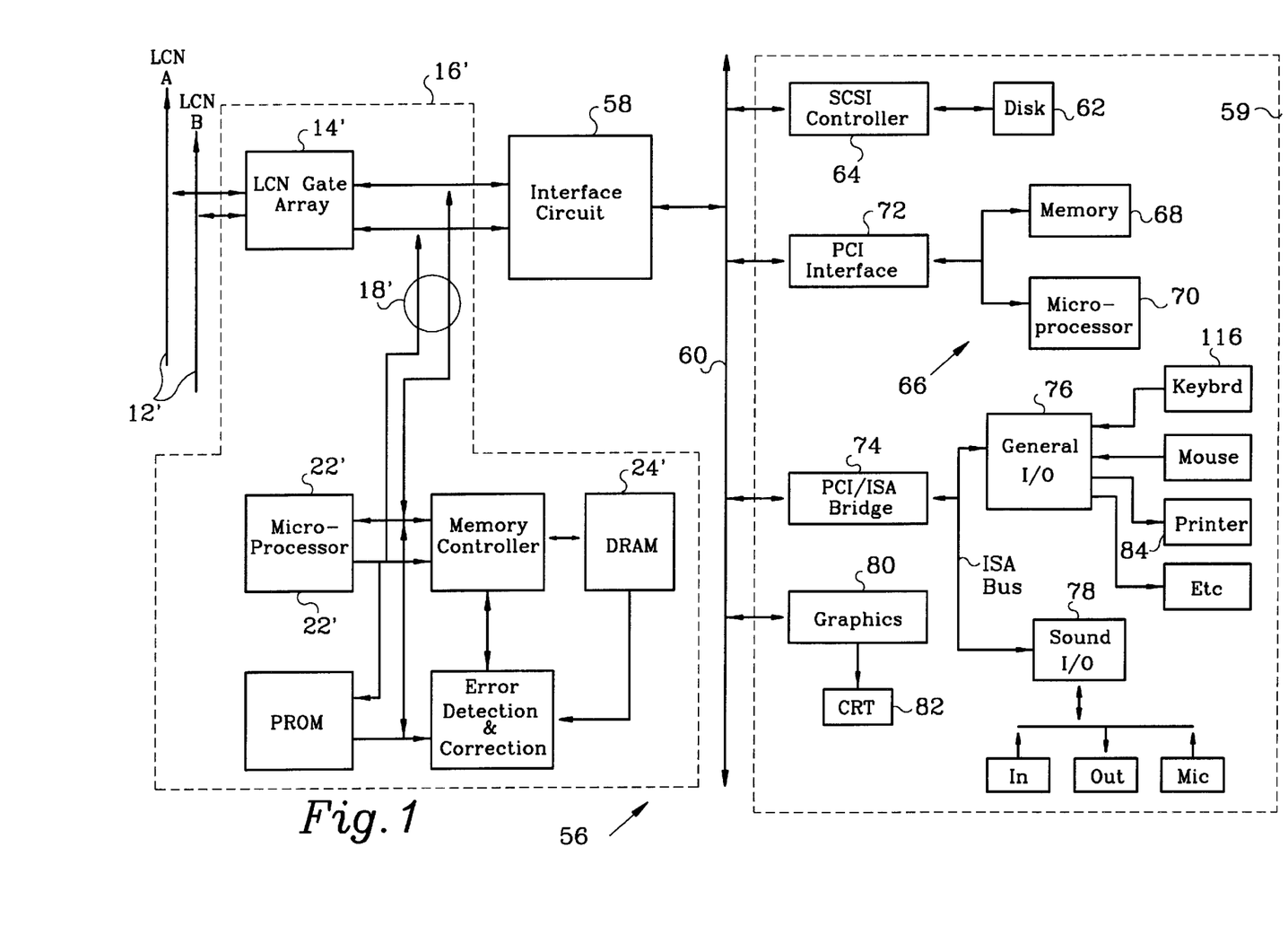
FIG. 1 is a block diagram of a universal operator station module which includes an interface circuit utilizing the control circuit of this invention.
Figure 2A:
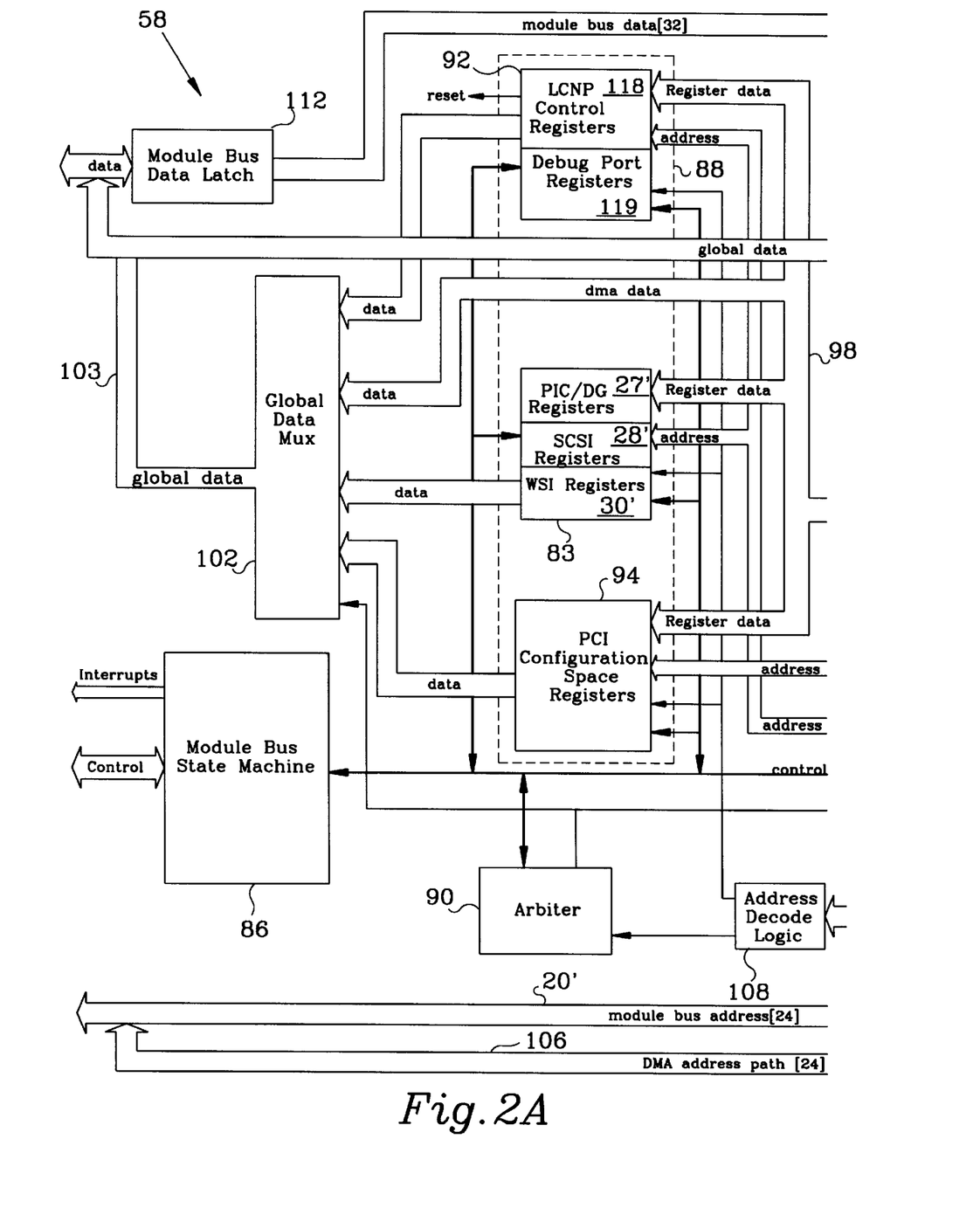
FIG. 2. is a block diagram of the interface circuit illustrating the main components the control circuit of FIG. 1.
Figure 2B:
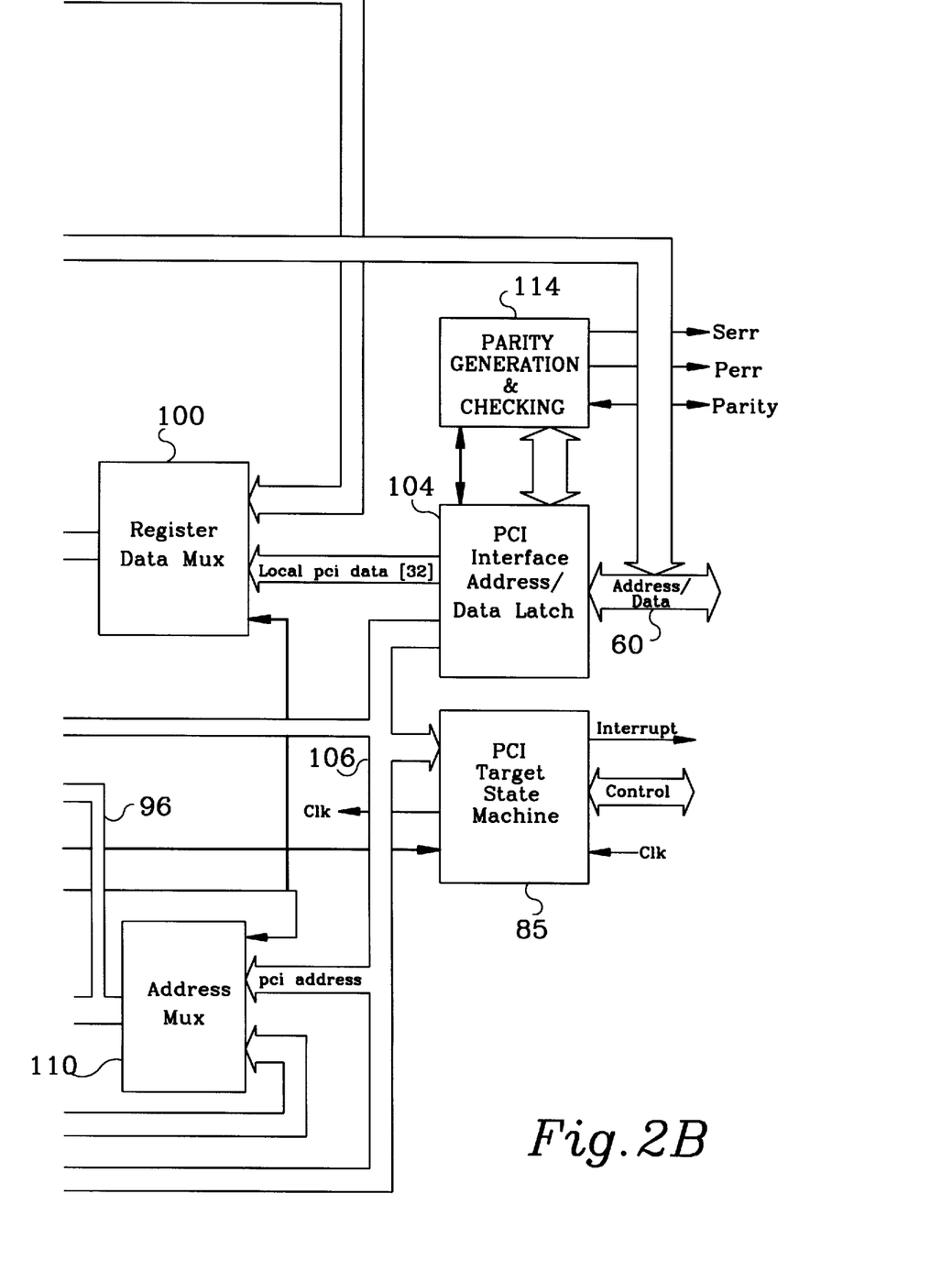

It should be noted that FIG. 1 of this application corresponds to FIG. 2 of the cross-referenced application, and FIG. 2 of this application corresponds to FIG. 3 of the cross-referenced application. The reference numerals on FIGS. 1 and 2 of this application are the same as those of FIGS. 2 and 3 of the cross referenced application with one exception to make the teachings of the two applications more easily understood.

Referring to FIG. 1, module 56 includes interface circuit 58 by means of which kernel submodule 16' communicates with the components of peripheral submodule 59 of module 56. The connection between interface circuit 58 and kernel submodule 16' is by means of module BUS 18', and the connection between interface circuit 58 and the components of peripheral submodule 59 is by means of peripheral component interconnect (PCI) local BUS 60. It should be noted that PCI buses are used in many commercially available products. PCI BUS 60 consists of a single 32 bit BUS on which addresses and data, commands and byte lane controls, are multiplexed plus control and interrupt lines. Module BUS 18' consists of two buses, a data BUS 19' of thirty two bits, and an address BUS 20' of 24 bits plus interrupt and control lines.

FIG. 2 is a block diagram of interface circuit 58 of module 56. Communication between kernel submodule 16' and interface circuit 58 is by means of module BUS 18' which includes data BUS 19', address BUS 20', and appropriate interrupt and control lines. Communication between interface circuit 58 and the components of peripheral submodule 59 of module 56 is by means of PCI BUS 60 and appropriate interrupt and control lines.

The function of interface circuit 58 is to convert signals from PCI BUS 60 which has its own signaling protocol to signals satisfying the signal protocol of module BUS 18', and to convert signals from module BUS 18' to signals satisfying the signal protocol of PCI BUS 60. In addition interface circuit 58 implements the hardware resources required to support the communications protocol utilized by the process control system in which module 56 is a component. In the preferred embodiment the process control system is a Honeywell Inc. TDC 3000. Ranges of the addresses on the module address BUS 20' define addresses of data in memory or hardware components of both submodules; i.e., operands, instructions, commands, or one of the control registers of register block 83. For example, one of the ranges of addresses contains addresses for selecting one of the control registers 27', 28' or 30'. Each of the control registers 27', 28' and 30' is used by kernel submodule 16' to control the operation of components of peripheral submodule 59 such as a printer 84, disk 62, CRT 82, etc.

The PCI protocol, more accurately signals on PCI BUS 60, are interpreted by PTSM 85, and the module BUS protocol, more accurately, control signals from kernel submodule 16' are interpreted by MBSM 86. Control signals such as FRAME, IRDY, CBE[3..0] inform the target, such as SCSI controller 64 for example, to which the signals are addressed when data is being transmitted over PCI BUS 60. It is a function of PTSM 85 to detect such signals to determine what control signals need to be sent to MBSM 86, ARSM 90 and to which one of interface registers 88. In addition PTSM 85 also produces PCI control signals required by the PCI BUS protocol. PTSM 85 advances to different states in synchronism with the PCI clock signals applied to it. PCI state machine 85 may dwell in a certain state while waiting for either a PCI BUS signal, or signals, or for control signals from MBSM 86.

Figure 3:
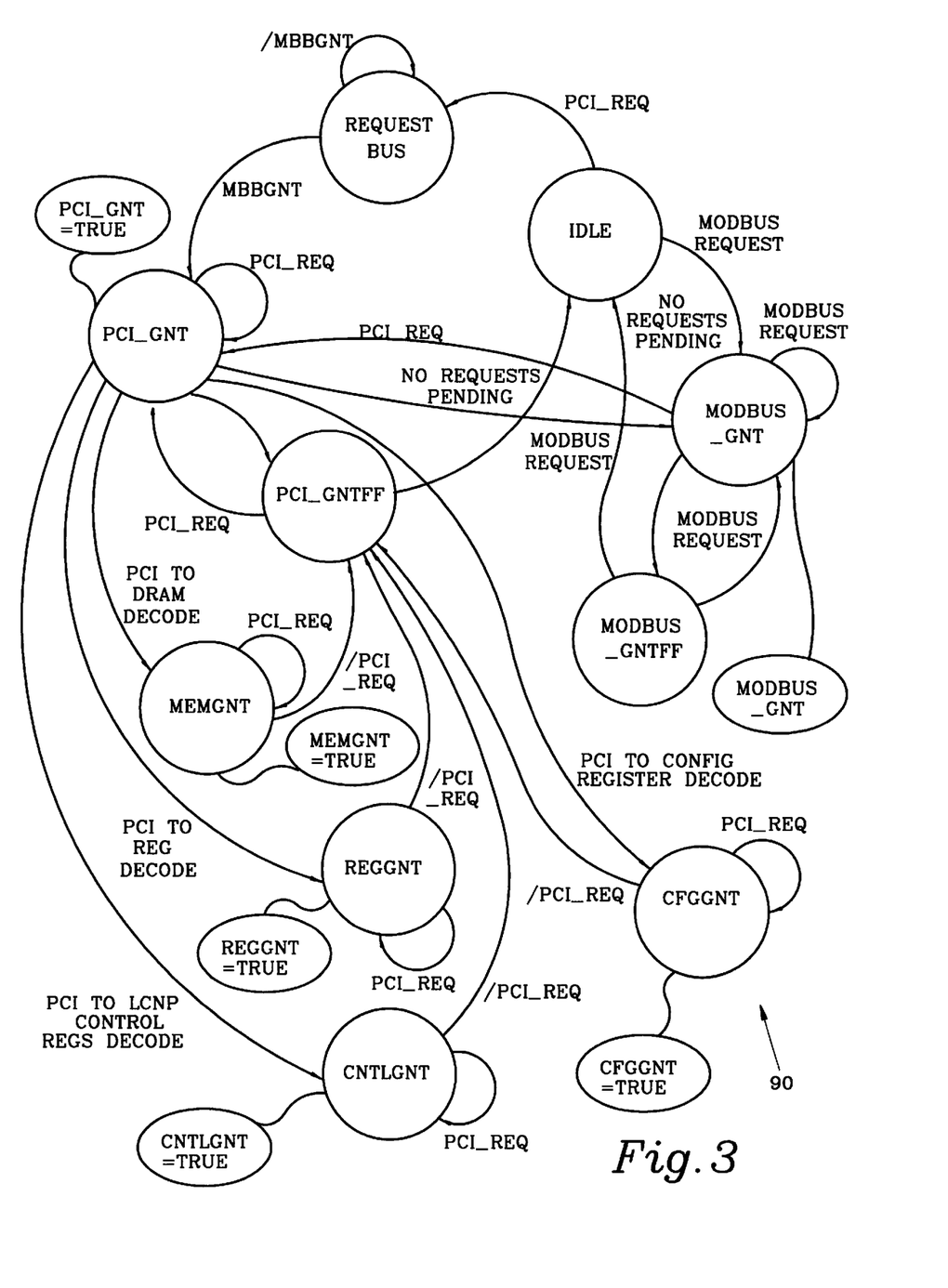
FIG. 3 is a state diagram for the arbiter state machine.

ARSM 90 is a synchronous state machine, the state diagram of which is illustrated in FIG. 3. ARSM 90 determines which BUS, PCI BUS 60 or module BUS 18, ' has access to one of the interface registers 88. Interface registers 88 include local control network processor (LCNP) registers 118 and debug port (DP) registers 119, control registers 27', 28' and 30' of register block 83, and PCI configuration space register 94. ARSM 90 also controls PCI accesses to address BUS 96 and data BUS 98. It should be noted that module BUS 20' does not have access to registers 94 nor to PCI BUS 60. Access by PCI BUS 60 to registers 94 is also controlled by arbiter 90.

Figure 4:
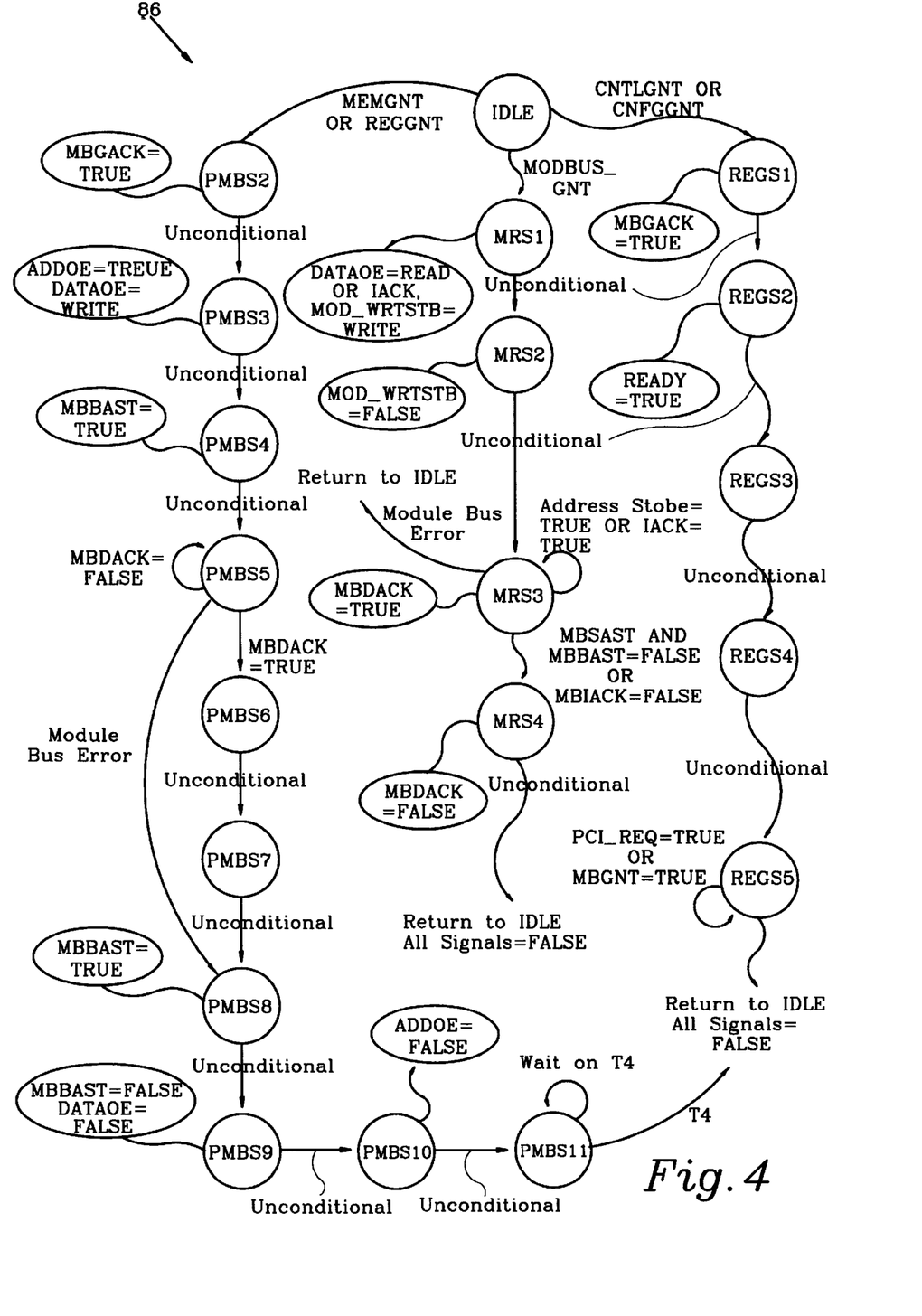
FIG. 4 is a state diagram of the module BUS state machine.

Module BUS state machine (MBSM) 86 is a synchronous one hot state machine, the state diagram of which is illustrated in FIG. 4. MBSM 86 produces MBSM control signals which allow kernel submodule 16' to read from, or write into, a register of debug port registers 119 or of a control register of control register block 83. MBSM 86 produces module BUS control signals which permit a direct memory access (DMA) operation to be executed by peripheral submodule 59 to or from DRAM 24' of kernel submodule 16'. MBSM 86 controls the timing of all accesses to any one of the registers of interface registers 88 by kernel submodule 16'. MBSM 86 also controls the timing of DMA cycles access to DRAM 24' over module BUS 20'. As a result, separate DMA circuits are not needed in interface circuit 58. MBSM 86 advances to different states in synchronism with the PCI clock signals applied to it, and it will change to the next state, or dwell in a given state, depending on control signals from module BUS 16', PCI state machine 85, and arbiter 90. MBSM machine 86 also controls PCI interrupt generation.

Figure 5:
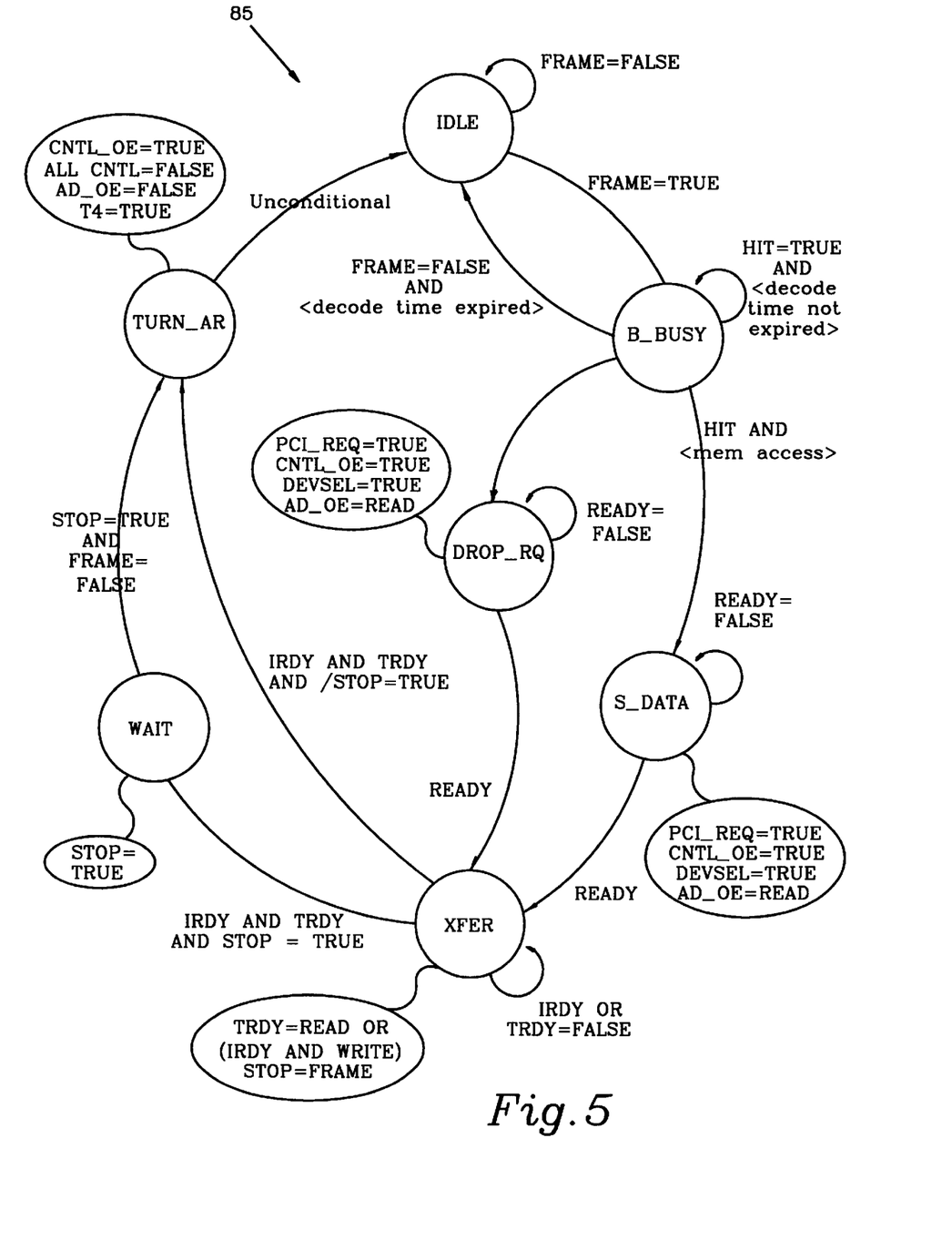
FIG. 5 is a state diagram of the PCI target state machine.

PTSM 85 is a synchronous one hot state machine the state diagram of which is illustrated in FIG. 5. PTSM 85 includes circuits to check PCI addresses applied to it; and if an address is in one of the identified ranges of PCI configuration space registers 94, a request for access to module BUS 20' is signaled to ARSM 90 by control signal $PCI_{13}$ REQ. Module BUS 20' is controlled by ARSM 90 to prevent kernel submodule 16' from having access to interface registers 88 of interface circuit 58 to either to read data from or to write data into registers 88 when PCI BUS 60 has access to control registers 88, DRAM 24', or status registers of kernel submodule 16'. MBSM 86 controls the timing of accesses by kernel submodule 16' to interface registers 88 and when the write or read cycle is completed, MBSM 86 returns control of module BUS 20' to processor 22' of kernel submodule 16'.

Requests for access to any of the interface registers 88 of interface circuit 58 or to DRAM 24' of kernel submodule 16' are routed through ARSM 90 which decides which submodule, kernel submodule 16' or peripheral submodule 59, or more succinctly, PCI BUS 60, or module BUS 18' will be granted access when such requests overlap. ARSM 90 is biased to grant the PCI BUS access when such requests are made simultaneously. Access cycles are initiated either by PTSM 85 entering a state that causes a request signal to be transmitted to ARSM 90, or by address decode logic (ADL) circuit 108 decoding an address in the proper range on module address BUS 20'.

FIGS. 3, 4 and 5 are state diagrams illustrating the states of arbiter state machine (ARSM) 90, module BUS state machine (MBSM 86, and PCI target state machine (PTSM) 85 respectively. In these figures the state of a state machine such as ARSM 90 is illustrated as a circle with the name, or acronym, for the state positioned in the circle such as the "IDLE" state in FIG. 3. A control signal produced by ARSM 90 when in its PCI_GNT state is positioned in an ellipse connected to the circle representing that state by a lead line.

As an example, the ARSM control signal PCI_GNT=TRUE is produced by ARSM 90 when in its PCI_GNT state. ARSM 90 will dwell in its PCI_GNT state as long as the PCI_REQ control signal is applied to ARSM 90. This is indicated by an arc with an arrowhead intersecting the circle defining a state. The name of the control signal is printed in proximity thereto. As an example, ARSM 90 will dwell in its PCI_GNT state as long as the control signal PCI_REQ is applied to ARSM 90 by PTSM 85.

PTSM state machine (PTSM) 85 will issue a request signal (PCI_REQ) in response to a PCI address being present on PCI BUS 60 which address is associated with one of the registers 88 of the interface circuit, or of DRAM memory 24' when such addresses are detected by the address checking circuit of PTSM 85; that signal . PCI_REQ causes ARSM 90 to change from its IDLE state to its REQUEST BUS state. ARSM 90 exits this state when the module BUS grant MBBGNT signal is received over one of module BUS 18's control lines, at which time the PCI_GNT state is entered. This state is held until the signal PCI_REQ request signal is removed. The PCI_GNT state causes two other concurrent states to be initiated. One is the PCI_GNTFF state which state is used to prevent reentering the PCI_GNT state if another PCI_REQ signal occurs directly after the prior PCI_GNT state. This allows module BUS 18' to gain access between back-to-back PCI access cycles. The other state is one of four possible states depending upon the resources of interface circuit 58 being accessed by the PCI BUS. The first such possible state is the memory grant state MEMGNT which authorizes a PCI to DRAM 24' access. This ARSM 90 state is entered if the address being accessed through PCI BUS 60 is in the range of 80000-FFFFF (hexadecimal). If so, address decode logic circuit (ADL) 108 produces ADL control signal PCI TO DRAM DECODE which is transmitted to ARSM 90. The second such possible state is the register grant state REGGNT which authorizes PCI access to one of the control registers 83. ARSM 90 enters its REGGNT state if the address on PCI BUS 60 is in the range of 43000–45FFF (hexadecimal) which causes ADL 108 to produce ADL control signal PCI TO REG DECODE. The third such state is the control grant state CNTLGNT which authorizes a PCI access to LCNP control registers 118 or to debug port registers 119 of register block 92. The CNTLGNT state is entered if the PCI address applied to ADL 108 by address multiplexer 110 is in the range of E000–EC00, or in the range of 50000 to 50004 (hexadecimal) which causes ADL 108 to apply ADL control signal PCI TO LCNP CONTROL REGS DECODE signal to ARSM 90. The fourth and last of such states is the configuration grant state CFGGNT which ARSM will enter if PCI BUS 60 is accessing configuration registers 94. The CFGGNT state is entered if the PCI address applied to ADL 108 is that of register 94 which causes ADL 108 to apply ADL control signal PCI TO CONFIG REGISTER DECODE to be applied to ARSM 90. These four states are mutually exclusive. Only one of the four states will be entered during any given PCI cycle. The state that is entered is held until the PCI_REQ signal is removed.

The receipt of a MODBUS request signal from ADL 108 by ARSM 90 causes ARSM 90 to enter its MODBUS_GNT state if the PCI_REQ signal is not active. ADL 108 will produce the MODBUS REQUEST control signal if the address applied to ADL 108 is from kernel submodule 16' and is in the address range of 43000–45FFF (hexadecimal). If both the MODBUS REQUEST and PCI_REQ control signals are active at the same time, the PCI_REQ has priority and the MODBUS$_1$.GNT state will not be entered.

The PCI_GNT state will not be entered if PCI_GNTFF is in its set state. The MODBUS_GNT state, if entered; i.e. there is no PCI REQ signal, initiates another state concurrently, the MODBUS_GNTFF state. The MODBUS_GNTFF state prevents the MODBUS_GNT state from being entered at the end of a module BUS access cycle. This allows a PCI access cycle if there are back-to-back module BUS cycle requests. The MODBUS_GNT state is held until the MODBUS REQUEST signal is removed.

Referring to FIG. 4, module BUS state machine (MBSM) 86 has three control paths.

The first path is the PCI to module BUS (PMB) path. Any PCI access to DRAM 24' of kernel submodule 16', or to interface control registers 27', 28', or 30' of register block 83 of interface circuit 58 are indicated by ARSM 90 being in its MEMGNT or REGGNT states. ARSM control signals MEMGRNT=TRUE, or REGGNT=TRUE from these states applied to MBSM 86 start MBSM 86 on its PM path. In the first state PMBS2, the module grant acknowledge signal (MBGACK=TRUE) is transmitted to kernel submodule 16'. MBSM 86 then unconditionally goes to its PMBS3 state on the next clock signal. In this state, the address output enable control signal ADDOE is asserted. The data output enable signal DATAOE is asserted if the PCI cycle is a write cycle (MBRW is deasserted). The ADDOE signal when asserted allows an address signal to be applied to module address BUS 20'. The data output enable signal DATAOE is asserted if the PCI access cycle is a write cycle and the module BUS read/write signal (MBRW) is driven to a value signifying a write. MBSM 86 then unconditionally goes to its PMBS4 state where it asserts the address strobe signal MBBAST. MBSM 86 then unconditionally advances to its PMBS5 state where it will dwell until it either receives a module BUS error signal (MBBERR), in which case it will advance to its PMBS8 state, or it receives a module BUS data acknowledge signal (MBDACK=FALSE) from kernel submodule 16'. Receipt of a MBDACK signal advances MBSM 86 to its PMBS6 state. There are no signal changes while MBSM 86 is in its PMBS6 state which is used as a one clock time delay. MBSM 86 then proceeds to its PMBS7 state. Again there are no signal changes while MBSM 86 is in its PMBS7 state, which provides a second time delay of one clock period after which MBSM 86 transitions to its PMBS8 state. MBSM 86 in its PBSM8 state asserts a ready to proceed signal READY to PTSM 85. MBSM 86 then advances unconditionally to is PMBS9 state where the signals MBBAST and DATAOE are deasserted; i.e., are FALSE, prior to proceeding unconditionally to its PMBS10 state. In the PMBS10 state the signal ADDOE is deasserted. MBSM 86 then goes unconditionally to its PMBS11 state where it dwells until PTSM 85 enters its TURN_AR state which is represented by the signal T4. Control signal T4 indicates that PCI BUS 60 has acknowledged the end of the PCI access cycle. When control signal T4 is asserted, MBSM 86 returns to its IDLE state where the signals MBGBACK and READY are deasserted.

The second control path of MBSM 86 is the path from module BUS 18' to one of the control registers of block 83 identified as the MR path in FIG. 4. The MR path is entered when ARSM 90 enters its MODBUS_GNT state and generates the MODBUS_GNT signal which is applied to MBSM 86. MBSM 86 upon the receipt of this signal proceeds to its MRS1 state. In this state the data output enable signal (DATAOE=READ) is asserted if the access cycle is a module BUS read (the module BUS read/write signal MBRW is asserted) or the cycle is an interrupt acknowledge cycle (MBIACK is asserted). The module BUS write strobe signal MOD_WRTSTB is asserted if the cycle is a write (MBRW is deasserted). The next state, MRS2 is entered unconditionally. In this state the module BUS write strobe signal (MOD_WRTSTB) is asserted if the cycle is a is a module BUS write. The next state, MRS3 is entered unconditionally and the module BUS data acknowledge signal (MBDACK) is asserted. MBSM 86 dwells in this state until one three conditions occurs. One condition is the receipt of a module BUS error signal MBBERR from kernel submodule 16', in which case MBSM 86 returns to its IDLE state. If the module BUS interrupt acknowledge signal MBIACK is asserted, MBSM 86 will remain in its MRS3 state. If not, a test is made for the assertion of a module BUS slot address strobe signal MBSAST and of a module BUS address strobe MBBAST. If both of these signals are true MBSM 86 dwells in its MRS3 state. If both of these signals are deasserted, or are false, MBSM 86 proceeds to its MRS4 state where the data acknowledge signal MBDACK is deasserted. MBSM 86 will then unconditionally enter its IDLE state where the data output enable signal DATAOE is deasserted.

The third control path of MBSM 86 is the PCI to LCNP control register 118 or to PCI configuration registers 94, the REG path. when ARSM 90 enters its control grant state CNTLGNT or configuration grant state CFGGNT, the control signals asserted by these state cause MBSM 86 to enter its REG path. In the first state of this path, REGS1 the module BUS grant acknowledge (MBGACK) signal is asserted. REGS2 is unconditionally entered on receipt of the next clock signal where the READY signal is asserted to PTSM 85. The next state REGS3 which is also entered unconditionally is a one clock time delay as is state REGS4. State REGS5 of MBSM 85 is entered unconditionally and MBSM 86 will dwell there until both the PCI_REQ and MBGNT signals are deasserted. When this happens, MBSM 86 return to its IDLE state and the signals READY and MBGACK are deasserted.

Referring to FIG. 5, PTSM 85 supports 2 types of access cycles, configuration accesses and memory accesses. Configuration accesses are for reads from and writes to PCI configuration space registers 94 as defined by PCI Specification Rev. 2.0. Memory accesses are reads from or writes to the any of the registers of block 83, block 92, or to DRAM 24' of kernel submodule 16'. Most of the states of PTSM 85 are shared by both configuration and memory accesses. The transaction type, memory read/write, or configuration read/write, is determined by PTSM 85 decoding the PCI command presented to interface circuit 58 during a PCI address phase.

The beginning of the transaction is signaled by the assertion of the control signal FRAME by peripheral submodule 59, which advances PTSM 85 from its IDLE state to its busy state B_BUSY. PTSM 85 will dwell in its B_BUSY state until one of three things occur: the transaction is decoded as a PCI memory access to LCNP and debug port registers 92, control registers 83 (registers 27', 28' and 30'), or to DRAM 24' of kernel submodule 16'; the transaction is targeted to another PCI entity which returns PTSM 85 to its IDLE state; or the transaction is decoded as a configuration access to PCI configuration space registers 94 which advances PTSM 85 to its DROP_RQ state. Entering the DROP_REQ state causes a BUS request control signal PCI_REQ to be issued to ARSM 90 and the device selected signal DEVSEL signal to be asserted on PCI BUS 60 indicating that interface circuit 58 has accepted the access and will respond. PTSM 85 will dwell in its DROP_REQ state until the signal READY signal is received by MBSM 86 which advances PTSM 85 to its XFER state. If the configuration transaction is a read, entering the XFER state causes PTSM control signal TRDY to be asserted on PCI BUS 60 signaling the interface circuit 58 is ready to transfer data. PTSM 85 will then dwell in the XFER state until the master; a component of peripheral submodule 59 authorized to transmit signals to or receive signals from PCI BUS 60, such as PCI interface circuit 72; asserts control signal IRDY at which time data will be transferred. If the configuration transaction is a write, entering the XFER state causes PTSM 85 to dwell until the PCI master of the transaction asserts the signal IRDY, signaling that the PCI master is ready to transfer data, PTSM 85 will then assert control signal TRDY and the data will be transferred. Assuming the configuration access is not a burst attempt by the master (described below), assertion of IRDY and TRDY at the same time will advance PTSM 85 to its turn around state TURN_AR, which allows the PCI master and PTSM 85 to deassert their respective PCI control signals, and stop driving, or de-asserting, PCI BUS 60's address and data signals (AD_OE=FALSE). PTSM 85 will then advance unconditionally to its IDLE state.

In the case of a memory access to registers 92 or to control registers 27' 28' and 30' of interface circuit 58 or to DRAM 24' of kernel submodule 16, the beginning of the transaction is signaled by the assertion of the signal FRAME, which advances PTSM 85 from its IDLE state to its BUSY state. PTSM 85 advances to its S_DATA state when the transaction is decoded as a memory access. Entering the S_DATA state will cause a BUS request signal PCI_REQ to be issued to ARSM 90 and the device select signal DEVSEL to be asserted on the PCI BUS 60 which indicates that interface circuit 58 has accepted the access and will respond. PTSM 85 will dwell in its S_DATA state until the READY signal is received from MBSM 86. This advances PTSM 85 to its XFER state. If the memory transaction is a read, entering the XFER state will cause the signal TRDY to be asserted on PCI BUS 60 signaling that the interface circuit is ready to transfer data. PTSM 85 will then dwell in the XFER state until the master asserts the signal IRDY at which time data will be transferred.

If the memory transaction is a write, entering the XFER state will cause PTSM 85 to dwell until the PCI master of the transaction asserts the control signal IRDY, signaling that the master is ready to transfer data. PTSM 85 will then assert the signal TRDY and data will be transferred. Assuming the memory access is not a burst attempt by the master, assertion of IRDY and TRDY at the same time will advance PTSM 85 to its TURN_AR state, which allows the master and PTSM 85 to deassert their respective PCI control signals and stop driving PCI BUS 60 address and data signals. PTSM 85 will then advance unconditionally to its IDLE state.

Bursts are not supported by interface circuit 58. If a burst is attempted by a PCI master, PTSM 85 will signal the master to terminate the burst attempt after only a single data phase (the signals TRDY and IRDY when both are asserted define a data phase). The master uses the control signal FRAME to define a burst attempt and to signal the last data phase in a transaction. The control signal FRAME is deasserted prior to the last data phase in such a transaction. Therefore, if the signal FRAME is asserted during a data phase, the master intends to execute another data phase. If the signal FRAME is not asserted during a data phase, the master is engaging in the last data phase in the transaction. PTSM 85 will sense the control signal FRAME during the XFER state on configuration and memory accesses and will respond with the assertion of the STOP control signal on PCI BUS 60 if a burst is being attempted. The STOP control signal will remain asserted through the data transfer, and signals the PCI master to terminate the transaction after the current data phase. Upon completion of the current data phase, PTSM 85 will advance from its XFER state to its WAIT state and will dwell in its WAIT state until the control signal FRAME is deasserted. Deassertion of the signal FRAME advances PTSM to its TURN_AR state. This allows the master and PTSM 85 to deassert their respective PCI control signals and to stop driving PCI BUS 60 address and data signals. PTSM 85 will then advance unconditionally to its IDLE state.

PCI system error signal SERR is asserted by PTSM 85 in the event of a catastrophic failure of kernel submodule 16', or of interface circuit 58, or when PTSM 85 is in its S_DATA or DROP-RQ states if an address parity error is detected. PCI parity error signal PERR is asserted by PTSM 85 when in IDLE or TURN-AR states if a data parity error is detected by parity generation and checking circuit 114.

From the foregoing it should be evident that various modifications can be made to the preferred embodiment without departing from the scope of the present invention.

We claim:

1. A control circuit for an interface circuit of a module of a distributed process control system, said module including a kernel submodule, a peripheral submodule, and an interface circuit, the interface circuit including an input data multiplexer, and interface registers; the kernel submodule having memory means, producing control and interrupt signals, and communicating with the interface circuit via a module BUS having a structure and a protocol, the peripheral submodule producing control and interrupt signals and communicating with the interface circuit via a second BUS having a structure and a protocol incompatible with that of the module bus; said control circuit comprising:

A) arbiter state machine (ARSM) means for producing ARSM control signals, module BUS state machine (MBSM) means for producing MBSM control signals, second BUS target state machine means for producing SBSM control signals, and address decode logic (ADL) means for producing ADL control signals;

B) said ARSM means producing ARSM control signals in response to MBSM control signals, SBSM control signals, ADL control signals, control signals from the kernel submodule, and control signals from the peripheral submodule; said ARSM control signals determining when the kernel submodule has access to one of the interface registers, or when the peripheral submodule has access to one of the interface registers or to the memory means of the kernel submodule;

C) the MBSM means producing MBSM control signals in response to ARSM control signals, SBSM control signals, and control signals from the kernel submodule; said MBSM control signals enabling the kernel submodule to read from or write into one of the interface registers of the interface circuit when the kernel submodule has access thereto, or enabling the peripheral submodule to read from or write into one of the interface registers or to read from or write into the memory means of the kernel submodule when the peripheral submodule has access to the interface registers or access to the memory means of the kernel submodule; said MBSM control signals controlling the timing of such accesses, and said MBSM control signals also controlling interrupts generated by the peripheral submodule;

D) the second BUS state machine means producing SBSM control signals in response to ARSM control signals, MBSM control signals, and control signals from the peripheral submodule; said SBSM control signals enabling the peripheral submodule to read from or write into one of the interface registers of the interface circuit or to read from or write into the memory means of the kernel submodule and when so to do; and E) the ADL means producing ADL control signals in response to address signals from the kernel submodule or the peripheral submodule being transmitted to the address decode logic through the input address multiplexer, said ADL control signals identifying the interface registers of the interface circuit or the memory means of the kernel submodule into which data signals are to be read from or to be written into by the submodule having access thereto.

2. The control circuit as set forth in claim 1 in which the second BUS is a peripheral component interconnect (PCI) BUS, the second BUS state machines means is a PCI target state machine (PTSM) and the SBSM control signals are PTSM control signals.

3. The control circuit as set forth in claim 2 in which the ARSM determines that the module BUS has access to the interface circuit in response to a module BUS request (MODBUS REQUEST) control signal being produced by the ADL means; or that the PCI BUS has access to the interface circuit in response to a PCI BUS request (PCI_REQ) signal from the PTSM, the ARSM granting the PCI BUS access to the interface circuit if both a MODBUS request signal and a PCI_REQ signal are applied to ARSM at the same time.

4. The control circuit as set forth in claim 3 in which the interface registers of the interface circuit include control registers, PCI configuration space registers, and LCNP control registers, and the MBSM has three control paths, a PCI BUS to module BUS (PM) path; a module BUS to one of the control registers of the interface circuit path, the (MR) path; and a PCI BUS to the configuration space registers or the PCI configuration registers (REG) path; the MBSM entering its PM path in response to a memory grant (MEMGNT) or register grant (REGGNT) control signal being produced by the ARSM.

5. The control circuit as set forth in claim 4 in which the MBSM enters its MR path in response to a module BUS grant (MODBUS_GNT) control signal being produced by the ARSM.

6. The control circuit as set forth in claim 5 in which the MBSM enters its REG path in response to a control grant (CNTLGNT) control signal, or a configuration grant CNFFGNT) control signal being produced by the ARSM.

7. A control circuit for an interface circuit of a module of a distributed process control system, said module including a kernel submodule, a peripheral submodule, and an interface circuit, the interface circuit including an input address multiplexer and interface registers; the kernel submodule having memory means and producing control and interrupt signals, said kernel submodule communicating with the interface circuit via a module BUS having a structure and a protocol, the module BUS including control and interrupt lines; the peripheral submodule producing control and interrupt signals, and communicating with the interface circuit via a second BUS having a structure and a protocol, the second BUS including control and interrupt lines, the structure and protocol the second BUS being incompatible with the structure and protocol of the module bus; said control circuit comprising:

A) module BUS state machine (MBSM) means for producing MBSM control signals, arbiter state machine (ARSM) means for producing ARSM control signals, and second BUS target state machine (SBSM) means for producing SBSM control signals; and address decode logic (ADL) means for producing ADL control signals;

B) said MBSM control signals being produced by the MBSM means in response to control signals and interrupt signals from the kernel submodule, to ARSM control signals, to SBSM control signals, and to ADL control signals; said MBSM control signals timing and controlling accesses to the interface registers of the interface circuit or to the memory means of the kernel submodule by the peripheral submodule, and for timing and controlling of accesses to the interface registers of the interface circuit by the kernel submodule;

C) said SBSM control signals being produced in response to control signals and interrupt signals from the peripheral submodule, in response to ARSM control signals, and to MBSM control signals; said SBSM control signals timing and controlling the second BUS and requests by the peripheral submodule for access to the interface circuit;

D) said ARSM control signals being produced in response to MBSM control signals, SBSM control signals, and ADL control signals; said ARSM control signals controlling when the peripheral submodule is granted exclusive access to the interface registers of the interface circuit and to the memory means of the kernel submodule, and when the kernel submodule is granted exclusive access to the interface register of the interface circuit; and E) said address decode logic circuit means in response to address signals being applied to said address decode logic circuit means by the address multiplexer for producing ADL control signals, said ADL control signals controlling the source or destination of data signals transmitted by or to the submodule having access to the interface circuit.

8. The control circuit as set forth in claim 7 in which the second BUS is a peripheral component interconnect (PCI) BUS, the second BUS state machines means is a PCI target state machine (PTSM) and the SBSM control signals are PTSM control signals.

9. The control circuit as set forth in claim 8 in which the ARSM determines that the module BUS has exclusive access to the interface circuit in response to a module BUS request (MODBUS REQUEST) control signal being produced by the ADL means; or that the PCI BUS has exclusive access to the interface circuit in response to a PCI BUS request (PCI_REQ) signal from the PTSM, the ARSM granting the PCI BUS access to the interface circuit if both a MODBUS request signal and a PCI_REQ signal are applied to ARSM at the same time.

10. The control circuit as set forth in claim 9 in which module BUS has access to the interface circuit unless a PCI_REQ control signal is applied to the ARSM means.

11. The control circuit as set forth in claim 10 in which the interface registers of the interface circuit include control registers, PCI configuration space registers, and LCNP control registers, and the MBSM has three control paths, a PCI BUS to module BUS (PM) path; a module BUS to one of the control registers of the interface circuit path, the (MR) path; and a PCI BUS to the configuration space registers or the PCI configuration registers (REG) path; the MBSM entering its PM path in response to a memory grant (MEMGNT) or register grant (REGGNT) control signal being produced by the ARSM.

12. The control circuit as set forth in claim 11 in which the MBSM enters its MR path in response to a module BUS grant (MODBUS_GNT) control signal being produced by the ARSM.

13. The control circuit as set forth in claim 12 in which the MBSM enters its REG path in response to a control grant (CNTLGNT) control signal, or a configuration grant CNFFGNT) control signal being produced by the ARSM.

14. The control circuit as set forth in claim 13 in which the ARSM means is a synchronous state machines, and the MBSM means and PTSM means are synchronous one hot state machines.

* * * * *